(12) United States Patent
Marcadier et al.

(10) Patent No.: US 8,668,761 B2
(45) Date of Patent: Mar. 11, 2014

(54) METHOD FOR PROCESSING AND RECYCLING ZINC-RICH IRON METALLURGY SIDE PRODUCTS

(75) Inventors: Eric Marcadier, Bordeaux (FR); Laurent Rizet, Viuz en Sallaz (FR); Valerie Bouclier, Thorens les Glieres (FR)

(73) Assignee: VB2M, Bordeaux (FR)

( * ) Notice: Subject to any disclaimer, the term of this patent is extended or adjusted under 35 U.S.C. 154(b) by 0 days.

(21) Appl. No.: 12/995,250

(22) PCT Filed: May 29, 2009

(86) PCT No.: PCT/FR2009/051015
§ 371 (c)(1),
(2), (4) Date: Nov. 30, 2010

(87) PCT Pub. No.: WO2009/156662
PCT Pub. Date: Dec. 30, 2009

(65) Prior Publication Data
US 2011/0100161 A1    May 5, 2011

(30) Foreign Application Priority Data
May 30, 2008    (FR) ...................... 08 53566

(51) Int. Cl.
*C22B 7/02*    (2006.01)
*C22B 3/06*    (2006.01)

(52) U.S. Cl.
USPC .................. 75/392; 75/739; 75/951; 423/140

(58) Field of Classification Search
USPC .............................. 75/392, 739, 961; 423/140
See application file for complete search history.

(56) References Cited

FOREIGN PATENT DOCUMENTS

| BE | 894733 A1 | 4/1983 | |
|---|---|---|---|
| EP | 0040659 A1 | 2/1981 | |
| EP | 854199 A1 * | 7/1998 | ................ C22B 7/02 |
| FR | 848049 | 10/1939 | |
| WO | WO 01/25497 A1 | 4/2001 | |
| WO | WO 2006/119611 A1 | 11/2006 | |

OTHER PUBLICATIONS

Machine translation of EP 854199 A1, published Jul. 22, 1998.*
H. Makkonen, et al., "Optimisation of Steel Plant Recycling in Finland: Dusts, Scales and Sludge", Resources, Conservation and Recycling, vol. 35, No. 1-2 (2002) pp. 77-84.
N. Leclerc, et al., "Hydrometallurgical Extraction of Zinc from Zinc Ferrites", Hydrometallurgy vol. 70, No. 1-3 (2003) pp. 175-183.
S. Langova, et al., "Atmospheric Leaching of Steel-Making Wastes and the Precipitation of Goethite from the Ferric Sulphate Solution", Hydrometallurgy vol. 87, No. 3-4 (2007) pp. 157-162.
International Search Report in connection with PCT/FR2009/051015 mailed Dec. 15, 2009.

* cited by examiner

*Primary Examiner* — George Wyszomierski
*Assistant Examiner* — Tima M McGuthury Banks
(74) *Attorney, Agent, or Firm* — Young & Thompson

(57) ABSTRACT

A process for processing metallurgic residue that is obtained from electric steelworks dust, ESD, essentially containing iron and zinc in the form of zinc oxide and zinc ferrites, as well as a processing of the blast-furnace slags, BFS, and a combination with a synergy effect.

8 Claims, 2 Drawing Sheets

METHOD FOR PROCESSING AND RECYCLING ZINC-RICH IRON METALLURGY SIDE PRODUCTS

Figure 1:
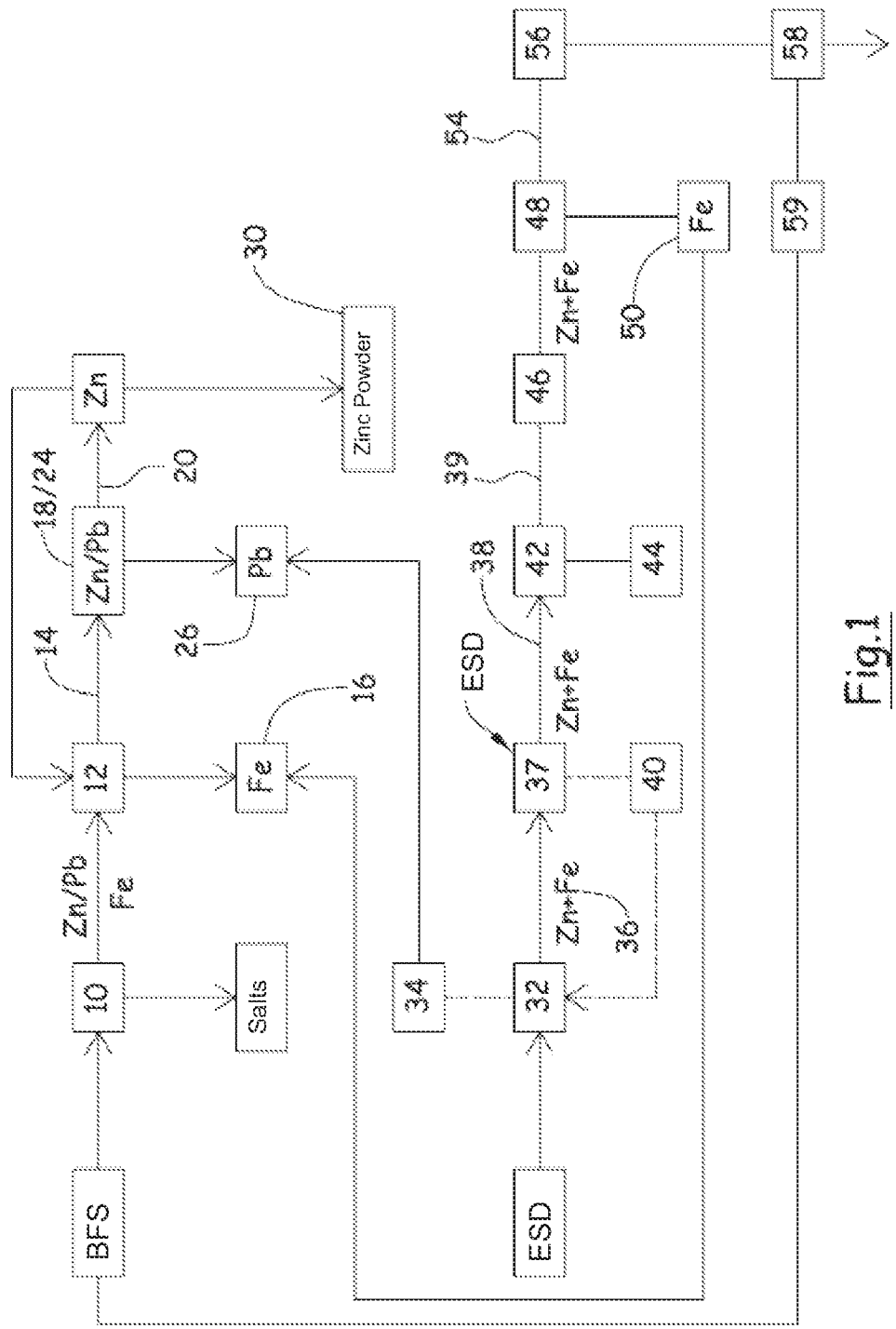

This invention relates to a process for processing and recovering zinc-rich ferrous-metallurgy co-products obtained from blast furnaces that are also known by the term of blast furnace slag BFS and electric steelworks dust, also called ESD.

It is known that in blast furnaces, during the reduction of ore by coke so as to obtain cast iron, and during the conversion of this cast iron into steel in a converter, it is necessary to evacuate the gases that are produced.

Since these gases transport particles and/or dust generated by the different heat treatments linked to these ferrous-metallurgy processes and since it is not permissible to discharge such gases directly into the atmosphere, these gases are purified, and generally the processing that is adopted is purification by aqueous-phase washing.

The result is the formation of slags that contain metal compounds in the form of oxides or hydroxides, coming from starting feedstocks of these blast furnaces, i.e., iron, for the most part, and non-ferrous compounds such as lead and zinc. These non-ferrous compounds are heavy metals and are therefore polluting and toxic.

These slags therefore cannot be spread in nature and cannot be recycled as they are as raw material into the blast furnaces from which they come. Actually, the contents of heavy metals and/or heavy metal oxides assume the metallurgical properties of the cast iron that is produced.

In the case of blast furnaces, the slags are either recycled after agglomeration if the iron level is adequate or are disposed of with all of the drawbacks that this represents: cost, and possible pollution despite the anti-leakage measures taken.

Actually, it is necessary to monitor these storage sites, and the corresponding grounds are immobilized, which also represents a cost.

In all cases, dumping in lagoons is only a temporary solution because it will one day be necessary to process these slags.

To provide a connection, the quantity of slag produced is on the order of 2 to 5 kilos of dry material per ton of cast iron that is produced after which it is hematite or phosphorous cast iron.

Likewise, the electric steelworks dust ESD is obtained from processing in an electric furnace of recovery scrap that is intended to be recycled.

Neither can this dust be directly recycled in the furnaces despite a strong iron content. The furnaces do not accept it because the strong content in particular of zinc disrupts their operation. In addition, the zinc would accumulate and the level would become much too high as well.

The zinc is present in two mineralogical forms: zinc oxide ZnO, known under the name of Zincite in a natural medium, and zinc ferrite $ZnFe_2O_4$, therefore zinc linked to iron oxides, difficult to process.

The quantity of dust that is produced is significant: on the order of 15 to 20 kilos per ton of steel produced with a zinc content on the order of 20% to 40%.

To recycle this ESD, it is possible to subject it to a pyrometallurgical processing to extract the zinc in its different forms, but because of the presence of other oxides, it is necessary to provide downstream a hydrometallurgical processing, which leads to a low-value recycling processing.

To be allowed into a storage center, it is necessary that the dust undergo a lixiviation processing and that the products obtained from this lixiviation lead to acceptable results relative to the existing standards, and if this is not the case, moreover in the most common situation, the ESD should be stabilized in advance, which also entails costs.

As for attacking the ESD directly by a hydrometallurgical process, this is entirely possible, but the known processes do not allow the recovery of zinc in the form of ferrite, which leads to residue from the hydrometallurgical process that is too loaded with zinc.

It should be noted that this BFS waste is essentially that which is already stored, because the recent productions of cast iron in the blast furnaces use low-zinc ores and therefore generate BFS with much more limited zinc levels on the order of 3 to 4% that are difficult to recover. In addition, these wastes are then much less polluting and toxic.

The regulation provides for prohibiting manufacturers from storing these blast-furnace slags and this electric steelworks dust and for imposing their depollution and recovery processing by recycling.

To provide an order of magnitude, the French stocks are estimated at more then 3 million tons for slags and the flow at 120,000 tons/year of electric steelworks dust or close to 30,000 to 40,000 tons of zinc to be recovered.

The process according to this invention relates to a processing of zinc-rich blast-furnace slags, BFS, and electric steel-work dust ESD that is also zinc-rich. This process ensures the recovery of zinc in all of its forms, makes it possible to place the residues from which heavy metals are removed in the final-waste storage center, is economically viable, and makes it possible to process the stored BFS.

A European Patent Application EP 854 199 that describes a process for processing metallurgical residue by a basic method that is more particularly applied to electric steelworks dust residue ESD is known. This process leads to the recovery of metallic zinc by electrolysis.

The European Patent Application EP 913 221 describes a processing of a basic solution that is loaded with electro zinc deposited after a recovery by a basic method such as the one that is described in the Patent Application EP 854 199 so as to prepare it for obtaining a fluid metallic zinc powder.

The electric steelworks dust was the object of processing lines by acid means.

Nevertheless, there is still a recurring problem: that of processing the ferrites in the case of the electric steelworks dust, on the one hand, and that of recovering blast-furnace slag residue within the same facility by making stages and connections between the lines in synergy.

It is the purpose of this invention that proposes a process for processing metallurgical residue that comes from electric steelworks dust, ESD, essentially containing iron and zinc in the form of zinc oxide and zinc ferrites, characterized in that it consists in producing the series of the following stages:
  Acid attack of a first quantity of ESD for dissolving iron, and zinc oxides, and breaking ferrites,
  Filtration providing a cake and a filtrate,
  Addition to the filtrate of a second quantity of ESD for neutralizing it partially and causing the dissolution of zinc oxides and breaking the ferrites of this second quantity of ESD,
  Cementation of the filtrate for removing the metals other than zinc and iron,
  Precipitation of iron by increasing the pH and separation for obtaining a cake,
  Obtaining a zinc acid solution.

The process is now described in detail according to a particular embodiment, starting from BFS and ESD having compositions such as mentioned below, for the essential and significant elements, object of this process.

| Compounds % of Dry Material | ESD | BFS |
|---|---|---|
| Zn | 37.40* | 28.60** |
| Fe | 25.70 | 7.20 |
| Pb | 1.46 | 5.90 |

*Including 87% in the form of ZnO
**Including 98% in the form of ZnO

According to the invention, the process for parallel and synergetic processing of BFS and ESD offers the advantage of compensating for the defects of the two separate processing cycles.

The invention is now described relative to the accompanying drawings in which the figures represent:

FIG. 1: A diagram of the process according to this invention that combines in an interactive way the processes for processing blast-furnace slags and electric steelworks dust, FIG. 2: A diagram of the water circuits showing one of the processing synergies.

The BFS, as indicated in FIG. 1, undergo a desalinization stage 10 for extracting the salts in chloride or sulfate form of the type NaCl, $CaCl_2$, $CaSO_4$, and $Na_2SO_4$ by a washing with water with an addition of sodium carbonate if necessary. This water is then neutralized.

Taking into account the zinc level in the form of zinc oxide ZnO that is much higher than that of the ferrites $ZnFe_2O_4$, the option is made for lixiviation or a basic attack.

This basic processing consists in subjecting the desalinized BFS to a basic attack, with soda, stage 12, so as to solubilize zinc and lead.

From this stage, a solution 14 is drawn that is rich in dissolved zinc and lead and a residue 16 that essentially comprises iron in its entirety, whereby this iron is not soluble in basic medium, and a very low percentage of zinc, more particularly in the form of ferrite $ZnFe_2O_4$. This residue can be agglomerated and reintegrated in a blast furnace because this residue is very low in metals other than iron.

The solution 14 that is rich in zinc and in lead is subjected to a purification stage 18 so as to separate, on the one hand, a zinc-rich solution 20, and, on the other hand, a lead-rich precipitate 26.

This purification stage 18 is a processing 24 by cementation, i.e., a reduction of metallic cations by another metal such as zinc so as to obtain the extraction of the precipitate 26 of metallic lead.

The zinc-rich solution 20 undergoes an electrolysis stage 28 in a known way so as to produce a directly marketable zinc powder 30. The electrolysis solution is recycled for the basic attack.

As far as the ESD is concerned, the method that is adopted is an acid treatment.

The primary treatment is therefore an acid attack stage 32, in particular with 20% hot sulfuric acid $H_2SO_4$. This attack actually makes it possible to separate the ferrites so as to recover from them zinc, on the one hand, and iron, on the other hand.

To begin the implementation, according to a test sample, 1 ton of ESD is subjected to 10 $m^3$ of 20% sulfuric acid.

The suspension is filtered to separate the filtrate and a cake 34 that contains lead and a small quantity of iron. This cake is combined with lead residue 26 that is obtained from basic processing after cementation.

The filtrate 36 contains zinc and iron, at most 99%, and even 99.9% for zinc. The content is then 29 g/l of iron and 42 g/l of zinc.

Crude ESD on the order of 300 kg/$m^3$, stage 37, which contains zinc hydroxide, alkaline, for raising the pH, is added to this filtrate 36, which is an acid solution at pH 0.0. To provide one example, the pH rises from 0.0 to 1.5. This has the result of keeping the zinc in dissolved form but without precipitating the iron. The zinc oxides in ZnO form of the added ESD are dissolved—although the iron level is maintained at approximately 26 g/l—but the zinc level rises to 147 g/l.

In turn, this solution is filtered to separate the filtrate 38 that contains zinc and iron and the cake 40, which is brought to the top of the process.

With continuous operation, this second cake that is obtained on the order of 550 kg/ton of ESD is brought to the top of the process; 3 $m^3$ of sulfuric acid is enough to break the ferrites that are contained in this cake and then to continue the cycles.

In the continuous operating mode, a filtrate with a mean of zinc of 100 g/l is obtained, with the iron remaining at its starting value at approximately 29 g/l.

The yield of extraction of the zinc initially present in the ESD is thus increased.

A savings of acid is noted in this process since that of the filtrate is recycled after iron and zinc are removed as indicated below.

The acid solution, consisting of the filtrate 38 that contains zinc and iron having thus been pre-neutralized, still remains at pH values of 1.5.

This filtrate undergoes a cementation stage 42, i.e., a reduction by another metal of metallic cations, present in a very small quantity. This cementation can advantageously be implemented with zinc. This makes it possible to remove these other metals 44 that do not concern this process directly.

From that time on, the acid solution of the filtrate 39 after cementation contains only iron and zinc, and its pH is on the order of 2.6, which can suitably be brought to 3.8 by dilution and/or by adding soda to stage 46 to precipitate the iron in oxidized form. The iron precipitates under different forms or in the form of a goethite-type oxide or in simple forms, in particular iron hydroxide and/or iron sulfate. The transformation into goethite depends on the supply of oxygen or the addition of hydrogen peroxide $H_2O_2$ or $O_2$ bubbling.

The solution is then filtered in stage 48 to isolate the iron oxide in the precipitate 50, orangey in color, held by the filter, while the filtrate 54 contains all of the zinc, generally being clear yellow in color.

The iron oxide precipitate 50 is transferred to combine it with the iron residue 16 that is obtained from the basic attack of stage 12 so as to also reinforce the iron level of this residue.

Once the iron is removed, the solution 54 sees its pH brought to 9 by adding a base, stage 56, and more particularly by the addition of a base, in particular by adding washing water obtained from the basic processing of the BFS and/or by adding as a make-up proportion, if necessary, a base of the sodium carbonate $Na_2CO_3$ type.

The zinc precipitates and the solution is filtered, stage 58, in such a way as to draw from it a cake 59 that contains almost only zinc.

In a first recovery solution, this precipitated zinc cake 59 can then be added to the top of the BFS processing process to enrich the starting solution and to obtain perfectly recoverable zinc powder at the end of the process.

It is also noted that there are other means of recovering products that are obtained from the process according to this invention.

Actually, the zinc-rich solution 54 can be transferred directly to electrogalvanizing baths before precipitation.

Even if the ESD processing process can be used by itself and is recovered and recoverable as such, it is also noted that it is possible to find a synergy effect in combination with a basic processing process of the BFS as described above.

Figure 2:
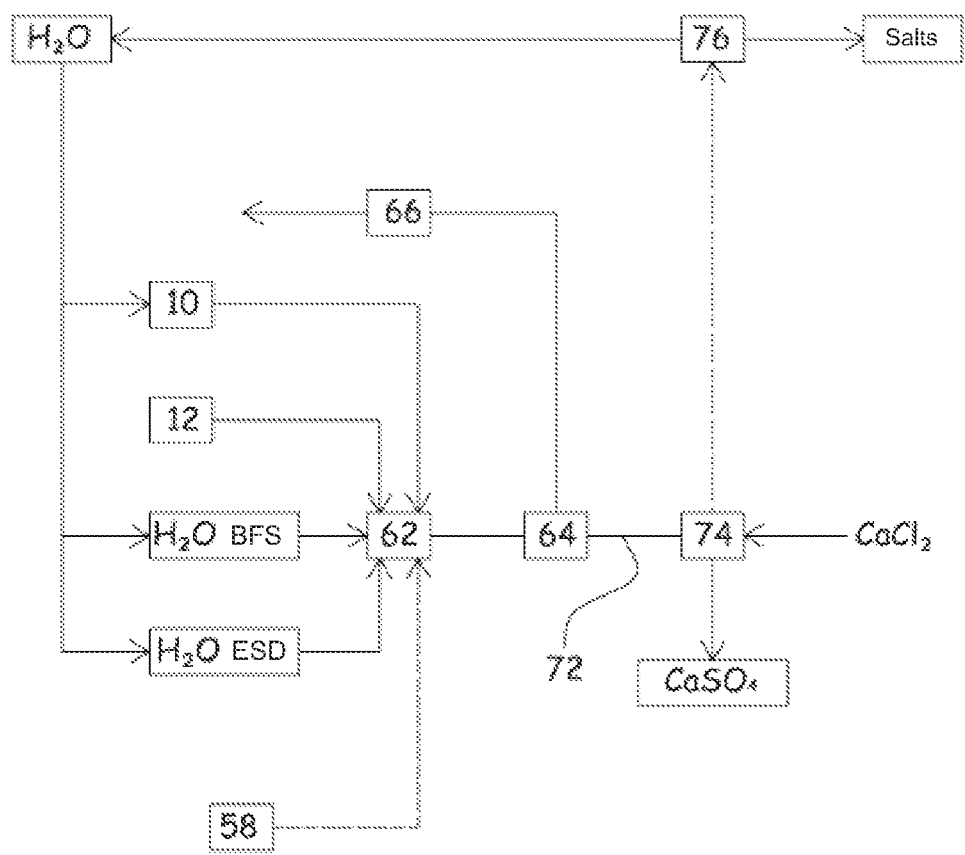

FIG. 2 shows a diagram of the circulation of waters for processing and recovery of different compounds that are conveyed there.

Actually, because of the coupling of a process by basic means and a process by acid means, it is possible to ensure a reciprocal neutralization of the effluents by limiting the consumption of the reagents.

The effluents come from the desalinization 10 and/or the possible drain-off from the basic processing 12 and/or the different washing cycles of the two basic and acid processes as well as optionally the filtrate after precipitation of the filtration stage 58.

All of these effluents are combined within a tank 62 to be neutralized there following the known neutralization reaction:

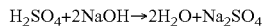
$$H_2SO_4 + 2NaOH \rightarrow 2H_2O + Na_2SO_4$$

The pH is adjusted to the optimal value for precipitation of metals by an addition of soda or acid if necessary.

After filtering—stage 64 at the output of the tank—on the one hand, a cake 66 that contains the metallic hydroxides that can return at the top of the basic processing process of BFS is obtained, and, on the other hand, a filtrate 72 that contains sodium chloride NaCl and sodium sulfate $Na_2SO_4$ is obtained.

Calcium chloride $CaCl_2$ is added to this filtrate in stage 74 so as to precipitate the gypsum $CaSO_4$ according to the known reaction:

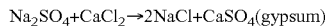
$$Na_2SO_4 + CaCl_2 \rightarrow 2NaCl + CaSO_4 (gypsum)$$

The solution comprises sodium chloride NaCl of the reaction and excess calcium chloride $CaCl_2$.

This solution, processed in an evaporator, stage 76, makes it possible to obtain recycled clear water and salts that can be recovered in the form of road treatment salt.

The invention claimed is:

1. A process for processing metallurgical residues that comes from electric steelworks dust (ESD) essentially containing iron and zinc in the form of zinc oxide and zinc ferrites, and metallurgical residue that is obtained from blast-furnace slags (BFS) essentially containing iron and zinc in the form of zinc oxide, comprising:

(a) a Stage A comprising the steps of:
adding an acid solution to a first quantity of the ESD to dissolve iron and zinc oxides and breaking ferrites,
filtering said first quantity of ESD to which said acid solution has been added to obtain a filtrate containing zinc, iron and metals from ESD other than zinc and iron and an ESD cake containing metals from ESD other than zinc and iron,
adding to the filtrate a second quantity of ESD for partially neutralizing and dissolving zinc oxides and breaking ferrites of the second quantity of ESD,
cementing the filtrate to remove metals from the ESD cake,
precipitating iron by raising the pH of the cemented filtrate to obtain a cake containing iron in a zinc acid solution, and
separating the cake containing iron from the zinc acid solution;

(b) a Stage B comprising the steps of:
desalinating the BFS by washing with water to remove salts and obtain a cake containing zinc, iron and metals from BFS other than zinc and iron,
adding a basic medium to the cake containing zinc, iron and metals from BFS other than zinc and iron to obtain a basic solution containing zinc and metals from BFS other than zinc and iron and a cake containing iron,
cementing the basic solution containing zinc and metals from BFS other than zinc and iron to obtain a BFS cake containing metals from BFS other than zinc and iron and a solution containing zinc, and
electrolyzing the solution containing zinc from the cementing step to obtain zinc in a powder form;

(c) a Stage C comprising the steps of:
introducing the zinc acid solution obtained in Stage A into the BFS before the step of adding the basic medium in Stage B,
combining the precipitated iron from Stage A and the cake containing iron from Stage B, and
combining the ESD cake of Stage A with the BFS cake of Stage B.

2. The process for processing metallurgic residue according to claim 1, wherein during Stage A, oxygen is added during the precipitation of iron in an oxide form by increasing the pH so as to increase formation of iron oxide of the goethite form.

3. The process for processing metallurgic residue according to claim 2, wherein
effluents obtained from (i) the step of desalinating in Stage B, (ii) the step adding a basic medium in Stage B, (iii) the acid solution of Stage A, and (iv) the basic medium of Stage B are combined to neutralize the effluents and proved a solution of sodium sulfate and sodium chloride.

4. The process for processing metallurgic residue according to claim 3, wherein calcium chloride is added to the solution of sodium sulfate and sodium chloride to form gypsum and water containing salts.

5. The process for processing metallurgic residue according to claim 4, wherein the water containing salts is subjected to evaporation so as to generate salts and water, and the water is brought to the top of the process.

6. The process for processing metallurgic residue according to claim 1, wherein effluents obtained from (i) the step of desalinating in Stage B, (ii) the step of adding a basic medium in Stage B, (iii) the acid solution of Stage A, and (iv) the basic medium of Stage B are combined to neutralize the effluents and provide a solution of sodium sulfate and sodium chloride.

7. The process for processing metallurgic residue according to claim 6, wherein calcium chloride is added to the solution of sodium sulfate and sodium chloride to form gypsum and water containing salts.

8. The process for processing metallurgic residue according to claim 7, wherein the water containing salts is subjected to evaporation so as to generate salts and water, and the water is brought to the top of the process.

* * * * *